United States Patent [19]

Caddell

[11] 4,411,357

[45] Oct. 25, 1983

[54] SAFETY DEVICE FOR USE IN CONVEYOR-TYPE APPARATUS

[75] Inventor: Samuel N. Caddell, Stoughton, Mass.

[73] Assignee: Systems Engineering and Manufacturing Corp., Stoughton, Mass.

[21] Appl. No.: 196,038

[22] Filed: Oct. 10, 1980

[51] Int. Cl.³ .............................................. B65G 17/00
[52] U.S. Cl. ..................................... 198/802; 134/77; 414/564; 104/127
[58] Field of Search .............. 198/342, 802, 477, 478; 134/76, 77; 204/202; 118/423, 425; 104/127–129; 246/122 K, 203 C, 204, 366; 414/564

[56] References Cited

U.S. PATENT DOCUMENTS

| | | | |
|---|---|---|---|
| 2,605,882 | 8/1952 | Curtis | 198/342 |
| 2,709,512 | 5/1955 | Curtis | 198/342 |
| 2,885,055 | 5/1959 | Hauck | 198/342 |
| 3,073,322 | 1/1963 | Dunning | 134/77 |

Primary Examiner—Joseph E. Valenza
Attorney, Agent, or Firm—Wolf, Greenfield & Sacks

[57] ABSTRACT

A flipper assembly has a flipper plate and an aligned guide rail both of which provide a support surface for a movable assembly. The flipper plate is movable into and out of the plane of the support surface. An extension arm is mounted on the guide rail for movement in a horizontal plane thereon and for movement in a vertical direction at the location of the flipper plate if permitted by the position of the flipper plate. The flipper plate is counterbalanced to an open position permitting the carrier arm to be moved vertically at that location, but is automatically positioned in a down closed position supporting the carrier arm in the plane of the guide rail support, by an automatic camming action as the slide arm moves toward and onto the flipper plate. In the preferred embodiment, the flipper plate safety device is utilized in a multistation work processing conveyor apparatus and is mounted on a vertical elevator.

6 Claims, 8 Drawing Figures

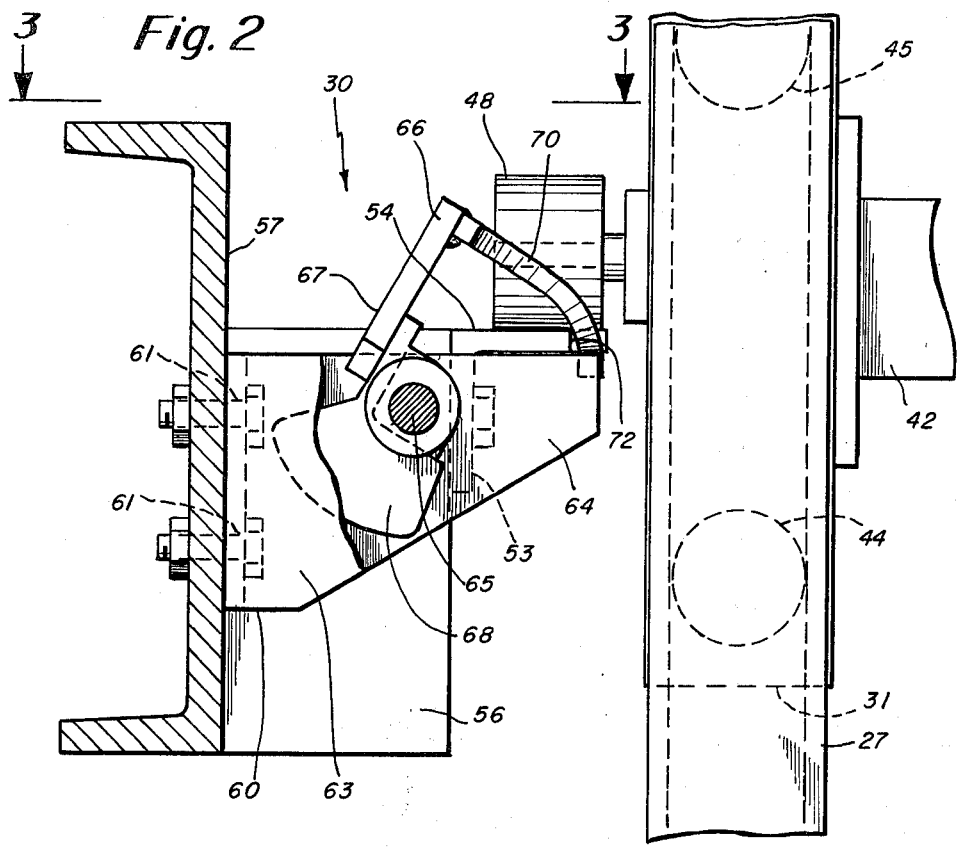
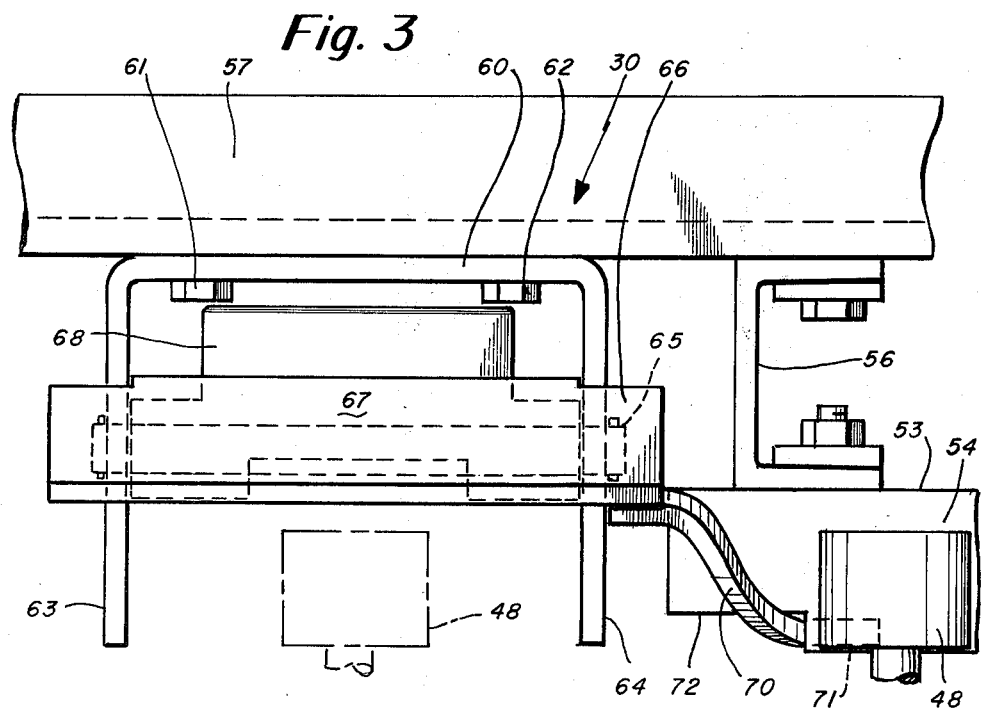

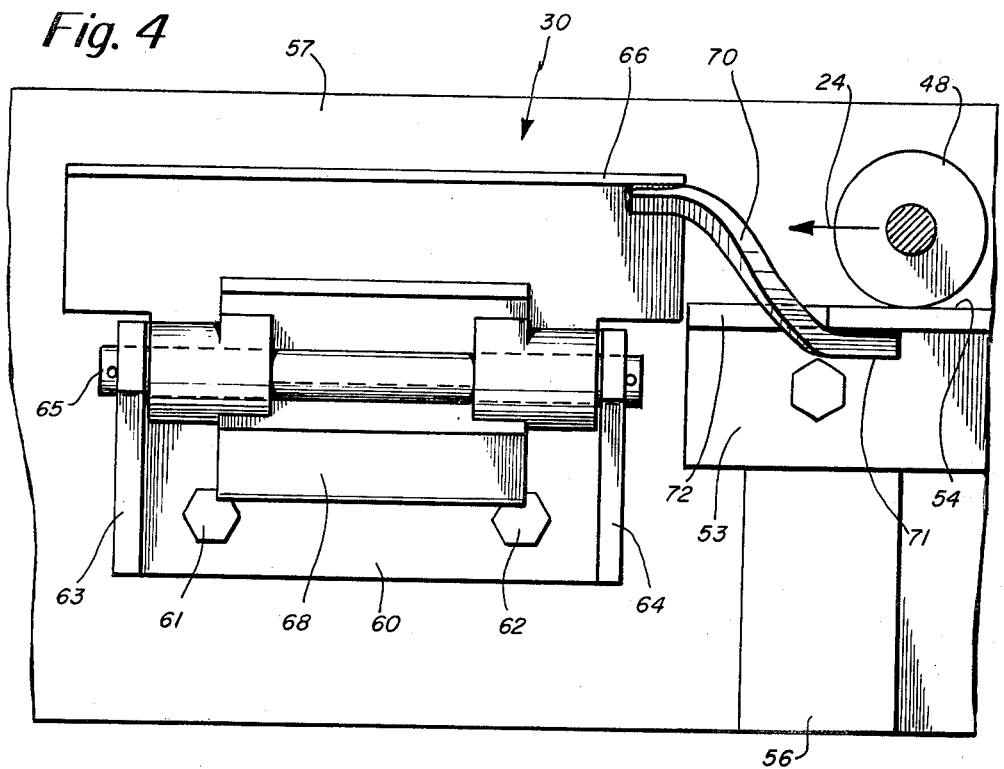
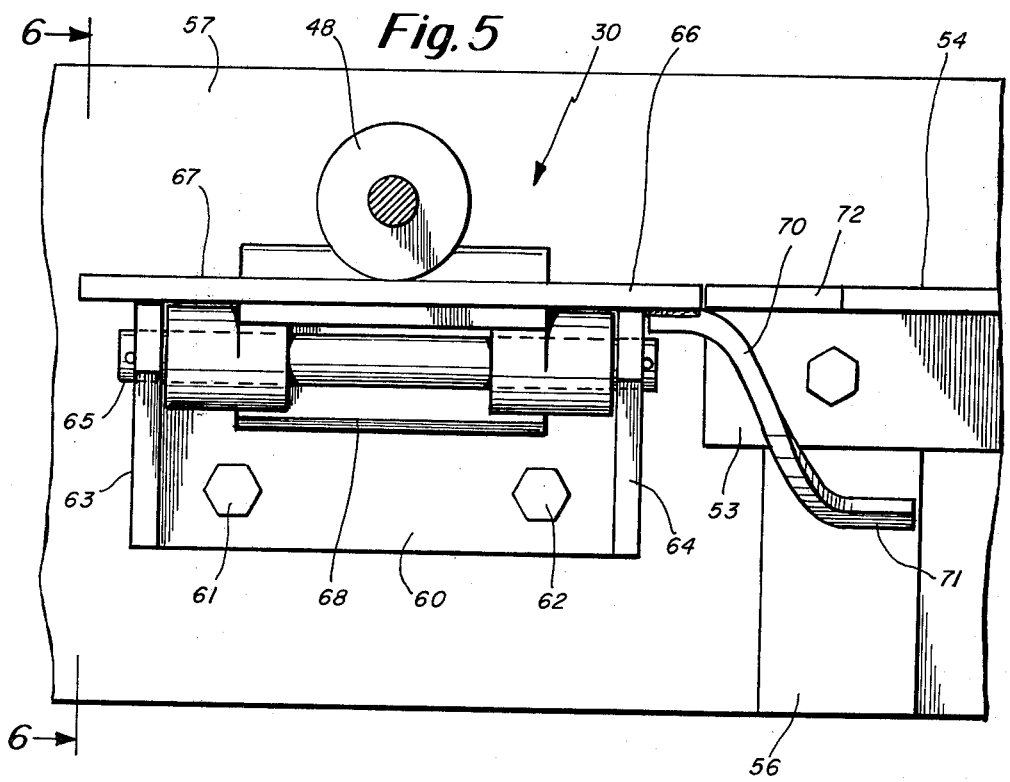

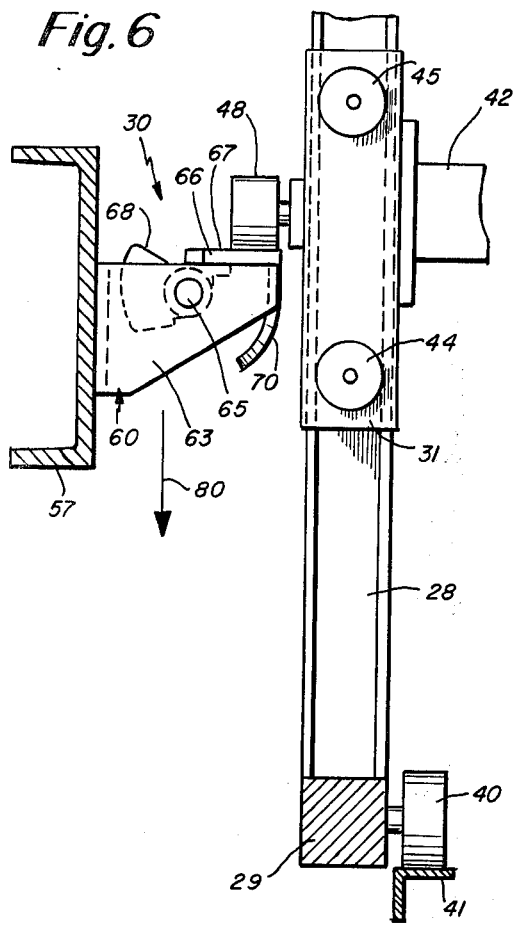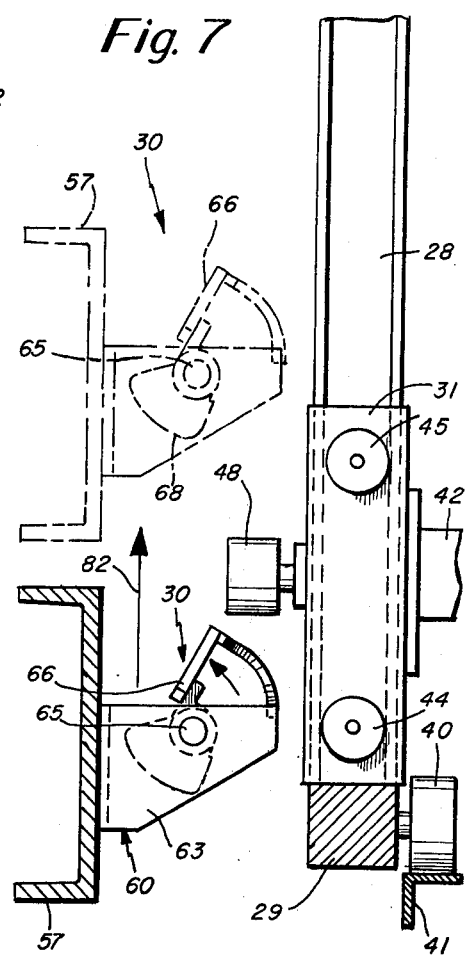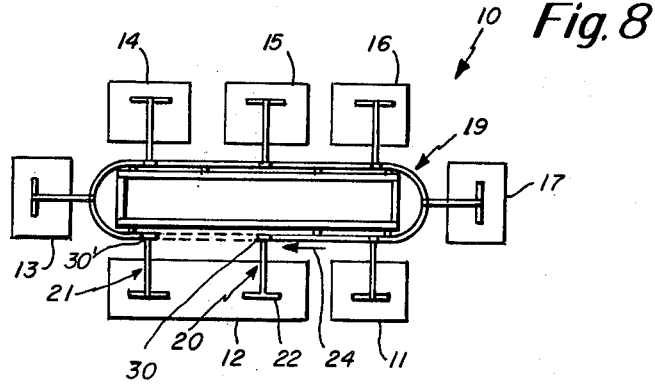

SAFETY DEVICE FOR USE IN CONVEYOR-TYPE APPARATUS

BACKGROUND OF THE INVENTION

Automatic elevator conveyors have been commonly employed for various work processing machines. Such machines are known particularly for use in the electroplating workpieces. A plurality of carriers are mounted in a conveyor arrangement on an endless track with each carrier having a vertically movable work supporting arm, elevator locations for moving selected workpieces vertically and means for advancing the arms horizontally along a defined path of travel through work treating locations or stations such as plating baths. Typical of such machines is the apparatus disclosed in U.S. Pat. No. 2,826,288 and those sold by Hanson Van Winkle Muning division of Systems Engineering & Manufacturing Corp. of Stoughton, Mass.

Such elevator conveyors have carrier arms which normally move along the horizontal path and are retained from downward movement in a vertical direction by elevator guide rails and spaced flipper mechanisms.

Vertical indexing motion of the slide or carrier arms is typically caused by the simultaneous movement of two parallel chains, (an upper and lower chain) driven by a gear/shaft/driving force on one end, and a gear/shaft arrangement on the other.

A pair of guide channels for each slide arm are firmly affixed between the chains. The slide arm is mounted between the guide channels.

Up and down movement of slide arms with attached carrier arms is normally by means of an elevating mechanism. This mechanism has an elevator guide rail which rises from underneath a roller wheel on the back of each slide arm, thus lifting the slide arm as it rises. The lowering motion of the elevator normally allows the slide arms to descend by gravity. The elevator lowers to a point below which the slide arm motion ceases, allowing the arms to rest on a lower chain attachment.

In single station operation wherein the machine lifts, indexes forward, lowers, dwells and repeats the sequence, a fixed elevator guide rail is normally the only requirement. In multiple station processes, so utilized because a longer dwell or immersion time is required, the elevator guide rail must have movable devices, commonly known as flippers.

A "normally open" flipper is used at the entrance station of a multiple station tank. Its function is to be in the closed position when the elevator is up so it can receive a slide arm. Closed position is one in which its protruding rail or track is in the same plane as the fixed elevator guide rail so it can receive a slide arm as the chains index forward. After it receives said arm, it is lowered with the elevator. The lowering motion allows the arm to rest on the lower chain attachment. The elevator continues its lowering motion, disengaging the rail/slide arm relationship. The flipper now pivots to the "open" position, at an angle which allows it to safely pass the slide arm's engagement point when a lifting motion occurs. The arm is left in the down position, and will continue to index in the down position until another flipper, "normally closed" is used to reengage the arm and return it to an up position.

In use, the slide arms are prevented from unwanted vertical drops by the underlying supporting flipper mechanism or fixed track. However, a problem has arisen in the positive positioning of the flipper mechanisms. When the slide arm reaches a predetermined work location in the up position, the flipper mechanism is supposed to be in a down position with a support plate supporting the arm normally in the plane of an upper guide rail. This position is imparted to the flipper plate (which is normally counterbalanced to an up opened pivoted position) by pins or mechanical stops of various kinds. It has been found in the past that such pins are sometimes ineffective to properly position the flipper plate due to misalignment in normal use, breakage or loss. When flipper plates are opened rather than in the down or safety position, when the slide arms reach their flipper positions, they will tend to drop abruptly. Such arms often carry substantial weights and volumes of workpieces which are then dropped into underlying tanks or stations. Aside from severe damage to the machine which can occur in these situations, a substantial safety hazard is presented to operators of the machine. Dangerous splattering of working solutions (which can be toxic acids) at the stations can occur, at a minimum, with severe damage to the work station or mechanism also often occurring.

A secondary but severe problem exists when the flipper does not open properly and partially engages the slide arm. The arm often falls with the same results as described above, or it will rise, be indexed forward and then fall because there is no fixed track provision between the entrance and exit positions of multiple station tanks.

Various electronic controls have been suggested for use in order to assure proper positioning of the flipper mechanisms. Such controls are costly and subject to unsure operations in certain situations. Known mechanical pin arrangements for assuring the position of the flipper plates while effective in most cases can become misaligned as described above.

SUMMARY OF THE INVENTION

It is an object of this invention to provide an improved flipper assembly which is automatically and positively moved to its closed safety support position by the approach of a carrier assembly which will be supported thereon.

Still another object of this invention is to provide a simple and inexpensive mechanism which is certain of operation and which uses substantially conventional parts without requiring substantial modification of existing apparatus.

Still another object of this invention is to provide an improved flipper mechanism in accordance with the preceding objects which is particularly adopted for use in multistation work processing conveyor apparatus to allow rapid and sure operation of such apparatus in a substantially conventional sequence of steps.

Still another object of this invention is to provide a method of operating a flipper mechanism and guide rail so as to provide for proper support by the flipper mechanism of a movable assembly to be supported in simple and sure operation actuated by movement of the assembly to the flipper plate and the use of a cam surface.

According to the invention a flipper assembly has a movable flipper plate mounted coextensively with an elevator guide support rail which provides a support surface. The flipper has a first position with its support surface coextensive with the surface of the guide rail and a second position with its surface removed from the guide rail surface. An extension arm is provided extending beyond the flipper surface and providing a sliding mechanical plane aligned with the guide rail surface so that when an assembly supported by the guide rail is moved toward the flipper, the extension arm is automatically engaged and acts to position the flipper surface in proper alignment with the guide rail surface to thereby support the assembly.

In the preferred embodiment, the improved flipper assembly is used as an arm entrance flipper in a multistation work processing conveyor apparatus having a carrier arm assembly with a vertically movable slide arm and attached carrier arm therein. An elevator is provided for moving the slide arm vertically up and/or down. Means are provided for advancing the carrier arm assembly horizontally along a defined path of travel through a plurality of work locations with each location corresponding to a work station having a sufficient area to accommodate at least one carrier arm at a time. Means are provided for positively holding the carrier arm assembly in a predetermined vertical location with said means comprising a guide rail defining a surface. A flipper assembly has a flipper plate aligned with the guide rail to form a coextensive surface with the surface provided by the guide rail. The flipper surface can move into an open second position allowing generally vertical movement of the slide arm above and below the guide rail surface when in its second position, and has a first closed position supporting the slide arm and preventing downward movement. The flipper assembly, guide rail and elevator mechanics are substantially as known in the prior art except for the use of the novel safety means of this invention which comprises an extension arm acting as a cam and fail-safe means. This extension arm extends into predetermined alignment with the surface of the guide rail so that a moving roller of the assembly uses the extension arm as a cam to positively and properly position the flipper plate to prevent unwanted falling of the slide arm whenever the slide arm approaches the flipper plate along the guide rail. Pivoting of the plate is carried out by the cam action to provide the plate as a stop against downward accidental movement of the carrier arm. A conventional counterbalance is used to positively open the flipper and put it in a raised position to leave the arm assembly free to be indexed in a lower position for movement of the arm therealong.

According to a method of this invention a safety feature is provided in a guide rail and flipper mechanism for supporting a horizontally and vertically movable assembly. The method comprises mounting a flipper plate in the path of the guide rail for movement to a first position acting as a support portion of the guide rail and a second position not aligned with the guide rail to permit movement of the assembly being supported into and out of alignment with the guide rail. An extension arm is provided acting as a cam surface and when the assembly is moved toward the flipper plate, the cam surface is actuated by the assembly to positively position the flipper in a support position whenever an assembly to be supported is moved along the guide rail toward and onto the flipper.

It is a feature of this invention that the improvement can be simple, easily formed and inexpensively applied to substantially conventional equipment. Despite its low cost and simplicity, the improvements solves a long felt need in the art. Positive safety features are imparted not hitherto known in this manner. The extension piece can be mounted on the flipper or on the assembly which is moved toward the flipper. In all cases, a camming arrangement is engaged between the movable member of the conveyor system and the flipper plate to positively force the flipper plate into a positive supporting position whenever the member to be supported is moved into the position of the flipper. The only position in which the member to be supported can drop to cause a safety hazard is if the flipper is in a normally open position.

BRIEF DESCRIPTION OF THE DRAWINGS

The above and other features, objects and advantages of the present invention will be better understood from a reading of the following specification in conjunction with the attached drawings in which:

FIG. 2 is a cross sectional view through line 2—2 of FIG. 1;

FIG. 3 is a top plan view thereof taken through line 3—3 of FIG. 2;

FIG. 4 is a front view of the improved flipper assembly of this invention showing the flipper in its first raised position;

FIG. 5 is a front view of the improved flipper assembly of this invention showing the flipper assembly in its support or second position carrying and supporting a roller of a carrier arm assembly of the apparatus of this invention;

FIG. 6 is a view through line 6—6 of FIG. 5 showing the slide arm roller of this invention resting on the improved flipper assembly of this invention;

FIG. 7 is a view similar to FIG. 6 but showing the slide arm in its vertically lowered position at its lowermost point of travel wherein the elevator releases the flipper to its automatically opened first position for upward movement without raising the arm; and FIG. 8 is a semidiagrammatic top view showing the overall apparatus of this invention including the guide rail with spaced work stations therealong.

Figure 1:
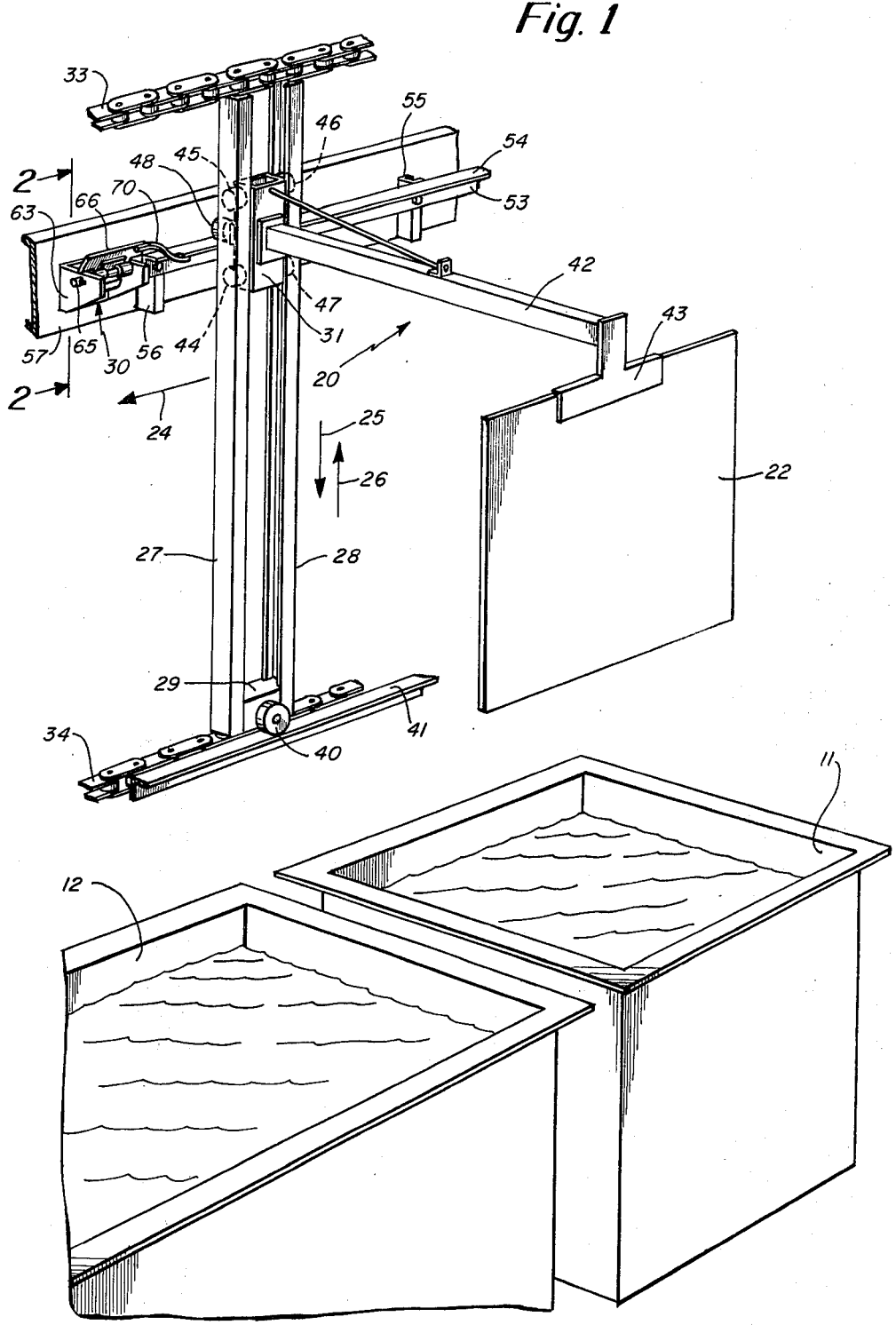
FIG. 1 is a perspective view showing a plurality of work stations along a multistation work processing conveyor such as an electroplating conveyor.

DESCRIPTION OF PREFERRED
EMBODIMENTS

With reference now to the drawings and more particularly FIGS. 1 and 8, a multistation work processing conveyor apparatus of the type used for electroplating is in part diagrammatically illustrated at 10. The conveyor apparatus follows an endless path or track 19 about which are arranged work stations 11–17 which can be electroplating tanks carrying various electroplating solutions. A plurality of arms 20–21 move around the path to position the arms at the various work locations or stations. At certain stations, the apparatus has the capability of stopping horizontal movement and having a slide arm move vertically downwardly to dip a workpiece in the solution, be indexed to carry the workpiece along in the solution a predetermined distance and then move vertically upwardly to remove the workpiece from the solution as diagrammatically shown in FIG. 8. Normally the arm is moved down and up by the elevator if it is merely immersing a workpiece in solution at a single horizontal position. When the workpiece is to move along the path 24 while in a solution, a first slipper mechanism 30 lowers the arm which moves along the path 19 in the lower position and is raised by a second flipper 30' on a second portion of elevator 57. The second flipper 30' can be a conventional normally closed flipper and need not be an improved flipper of this invention.

A typical workpiece is shown in FIG. 1 at 22. Carrier arm assembly 20 and all other portions of the machine except for the flipper assembly 30 are substantially conventional and well-known in the art. The arm assembly which can be one or any number, in standard machines, moves around the horizontal path in a single direction, such as the direction of arrow 24, along a horizontal path. A flipper assembly 30 is located in selected positions such as above the work location of a multiple tank 12 to permit a slide arm of the carrier arm assembly to be vertically lowered to lower a workpiece in the tank or work station 12.

The slide arms are reciprocal in the direction of arrows 25, 26 of FIG. 1.

Each carrier arm assembly comprises vertical U-shaped channels 27, 28 fixed in position by a lower chain attachment fitting 29 and a sliding slide arm 31. The channels 27 and 28 are fixed to upper and lower chain drive means which act as means for moving the carrier arm assemblies over horizontal path 24 and are linked directly to the guide channels 27, 28. The lower end of the carrier arm assembly has an attachment fitting 29 mounting a roller 40 mounted on a lower support rail 41 which can support the chain and slide arm. The carrier arm assembly carries carrier arm 42 fixed on the slide arm 31 and extending outwardly therefrom carrying a T-shaped workpiece holder 43 or a plurality of holders, on which the workpiece 22 is carried. The carrier arm 42 is fixedly mounted on the slide arm 31 which is in turn carried by four rollers 44–47 for free vertical reciprocal movement in the direction of arrows 25, 26. A fifth roller on the slide arm acts as support roller 48. Support roller 48 is mounted along the horizontal planar path of movement of a carrier arm assembly by a guide rail 53 mounted on an elevator 57 on the frame of the machine. Guide rail 53 has a horizontal support surface 54. Rail 53 is mounted on blocks 55, 56 and the like which are in turn mounted by bolts on a vertical elevator 57. The vertical elevator 57 further mounts the flipper assembly as will be described.

The entire upper guide rail completely about the path of arrow 24 can be mounted on an elevator apparatus as in the embodiment of FIG. 1 along with the flipper. As can be seen, the guide rail 53 defines the path of movement 24 of the carrier arm assemblies in the raised position of the carrier arms. When the slide arms carried by support roller 48 are in the position shown in FIG. 1, they cannot move downwardly but are carried along during movement of the horizontal drive chains which act as means for moving along the continuous path in a direction of arrow 24.

The flipper assembly 30 is best seen in FIGS. 4–7. Substantially conventional features of the flipper assembly include a U-shaped base 60 bolted by bolts such as 61, 62 firmly to an elevator 57 which is mounted for vertical movement by vertical movement means not shown. The U-shaped bracket 60 provides forwardly extending wedge-shaped parallel side arm pieces 63, 64 which carry a bore mounting a pivot pin 65. Mounted on the pivot pin 65 is plate 66 having a counterweight portion 68 as best shown in FIGS. 2–4. The counterweight constantly biases the plate planar surface 67 into its uppermost position shown in FIG. 2. All of the above structure is known in the art.

The prior art relied on mechanical finger means acting on the plate 66 to position it properly during the desired movements of the elevator and slide arm assembly. Such means was in the form of a rod mounted above the flipper plate. The rod pushes the flipper into the closed position. Because the rod is fixed, the flipper must present a reasonably open face to the rod. This need inhibits the amount of clearance by which the flipper can pass the carrier arm engagement point as it rises.

Now according to the invention, an extension piece or arm 70 is welded or otherwise secured to a lower edge of the plate 66 on the lower surface thereof and extends toward and into a notch provided in the upper surface of rail 54. The L-shaped rail 53 is cut away at 72 as best shown in FIGS. 2 and 4 to provide for the extension lying within the bounds of the parallel edges of the rails as best shown in FIG. 2. The extension piece is free at its end 71 which underlies the support surface of the rail and is stopped thereby thus acting as a limit for upward movement and pivoting of the plate 66. Extension piece 70 acts as a cam as will be described.

When roller 48 moves along with the slide arm in the direction of arrow 24, the roller must engage the extension piece 70 since it extends across the path of travel of the roller. The roller pulls the extension piece under it lowering the support plate 66 of the flipper mechanism to its down supporting position as shown in FIGS. 5 and 6 whereupon the weight of the slide arm rests thereon. Thus since the roller 48 only moves in the direction of arrow 24, there can never be a normal situation where the flipper plate will remain up allowing the slide arm to drop when the roller 48 approaches the flipper plate. When the flipper plate is in the position of FIGS. 5 and 6, its upper surface is substantially planar with and coextensive with the upper support surface 54 of the guide rail 53.

Since the flipper assembly is mounted for vertical movement along with the vertical elevator 57, only a U-shaped channel section of which is shown in the drawings, the entire slide arm assembly can be vertically lowered below the support plane of the guide rail by lowering of the elevator while the flipper is down. Downward movement of the slide arm assembly enables the workpiece to be immersed in a solution at the work station such as 11 or 12.

When the elevator 57 moves the slide arm downward (see arrow 80 FIG. 6) to its lowermost position as best shown in FIG. 7, the slide arm and/or roller 44 act as a base and bottoms out on the lower member 29. The elevator continues downwardly as shown in FIG. 7, thus permitting the counterweight 68 to raise the flipper plate to the position shown in FIGS. 2 and 7. The elevator can now be vertically reciprocated in the direction of arrow 82 since the flipper plate pivotal position is such that it will clear the roller 48 when moved upwardly. The upward flipping of the flipper plate is accomplished automatically by means of the counterweight. This enables the elevator to be removed from the horizontal second path of travel of the slide arm which is along the lower path defined by the lower support guide rail 41. Thus, the workpiece can be carried in a large tank, supported by roller 40, along the lower rail as to another station in tank 12 where a second flipper when lowered to the position shown in FIG. 7 can pick up the slide arm. The second flipper can be a substantially duplicate but normally closed flipper having its plate spring loaded to its correct support position whereupon the elevator at the station, can raise the slide arm to the uppermost rail path defined by the rail 53.

The machine can be scheduled to provide for proper lowering or raising at various flipper stations as may be desired.

The extension arm 70 acts as a cam or inclined plane on which the roller rolls to positively mechanically position the flipper plate in a support position at all times when the roller approaches the plate.

While the specific embodiment shown calls for a generally S curved arm entering a portion of the space between the side edges of the rail to which it is attached through a notch, many variations are possible. For example no stop end 71 need be used but another stop for movement of the plate can be used. In some cases, a roller can be mounted on the flipper plate with an extension arm 70 carried by a portion of the carrier arm assembly to move the roller over the cam surface when the slide arm approaches the plate. Such reversal of parts should be considered the full equivalent of the embodiment shown.

The exact shape of the cam surface can vary as can its positioning. In all cases a mechanical interlock is provided with sliding or rolling surfaces providing for positive positioning and means provided to enable the flipper plate to move to either a supporting operative position or a non-supporting, opened position during certain portions of the operation of the overall apparatus.

According to the method of the invention, one provides a cam means in the path of travel of a horizontally moving assembly which assembly has a portion capable of vertical movement, but is supported by a horizontally located rail to prevent such vertical movement. The cam means is keyed to a rail support portion to prevent that portion from providing a gap in the support for the vertically movable portion of the assembly. A flipper plate provides the gap and is preferably biased to a position which swings out of the way of the rail to enable up movement of an elevator without engaging the assembly which has just lowered. Down movement of the elevator is carried out with the flipper horizontal, holding and carrying the vertically movable portion.

While horizontal and vertical have been noted here, it should be understood that the cam assembly is useful for moving track portions into and out of a path as desired. The terms "horizontal" and "vertical" are relative and of course generally horizontal, generally vertical and angled arrangements of various sorts are possible and within the scope of the invention. Similarly while a specific example has been shown and described in the form of an electroplating apparatus, other forms of the invention are possible. The mechanism and programming for movement of the conveyor described in part above can be as conventional in the art and can vary greatly depending upon the specific apparatus and its specific purpose.

In all cases, the flipper mechanism of the present invention with its associated improvement in the form of a cam surface, acts to provide a fail-safe mechanism to prevent unwanted dropping of arms in multistation apparatus when used in apparatus of the type described above.

What is claimed is:

1. A multistation work processing conveyor apparatus comprising, a carrier arm assembly mounted for movement along a horizontal path and having a vertically movable slide arm therein, an elevator for moving said slide arm vertically in an up or down direction, means for advancing the carrier arm assembly horizontally along a defined path of travel through a plurality of work locations, each location corresponding to a work station having a sufficient area to accommodate at least one carrier at a time, means for positively holding the slide arm in a predetermined vertical location along said horizontal path and comprising a guide rail defining a support surface, a flipper plate mounted on said elevator and defining a portion of said guide rail surface for moving into an open second position out of contact with said slide arm allowing generally relative vertical movement of said slide arm with respect to said elevator when in said second position and supporting said slide arm and preventing unwanted movement in a downward direction when in a first position with said first position of said flipper plate further permitting vertical movement of said slide arm with said slide arm supported by said flipper plate, and a safety means comprising a portion of said flipper plate and having a cam surface for responding to direct contact with a portion of said carrier arm assembly and for positively positioning said plate in said first position by mechanical contact action.

2. A multistation work processing conveyor apparatus in accordance with claim 1 and further comprising said flipper plate being counterbalanced to said open second position.

3. A multistation work processing conveyor apparatus in accordance with claim 2 and further comprising said flipper plate carrying an extension arm extending toward said guide rail and acting as said cam surface of said safety means.

4. A multistation work processing conveyor apparatus in accordance with claim 3 and further comprising said extension arm having an end extending under said guide rail acting as a stop to said counterbalance.

5. A multistation work processing conveyor apparatus in accordance with claim 4 and further comprising said extension arm extending into and through a notch provided in said guide rail and aligned with a roller carried by said carrier arm assembly.

6. A multistation work processing conveyor apparatus in accordance with claim 5 and further comprising said extension arm being generally S-shaped and extending generally in the path of said guide rail acting as a positive fail-safe device for engagement with said carrier arm when it moves along its path of travel on said guide rail.

* * * * *